UNITED STATES PATENT OFFICE.

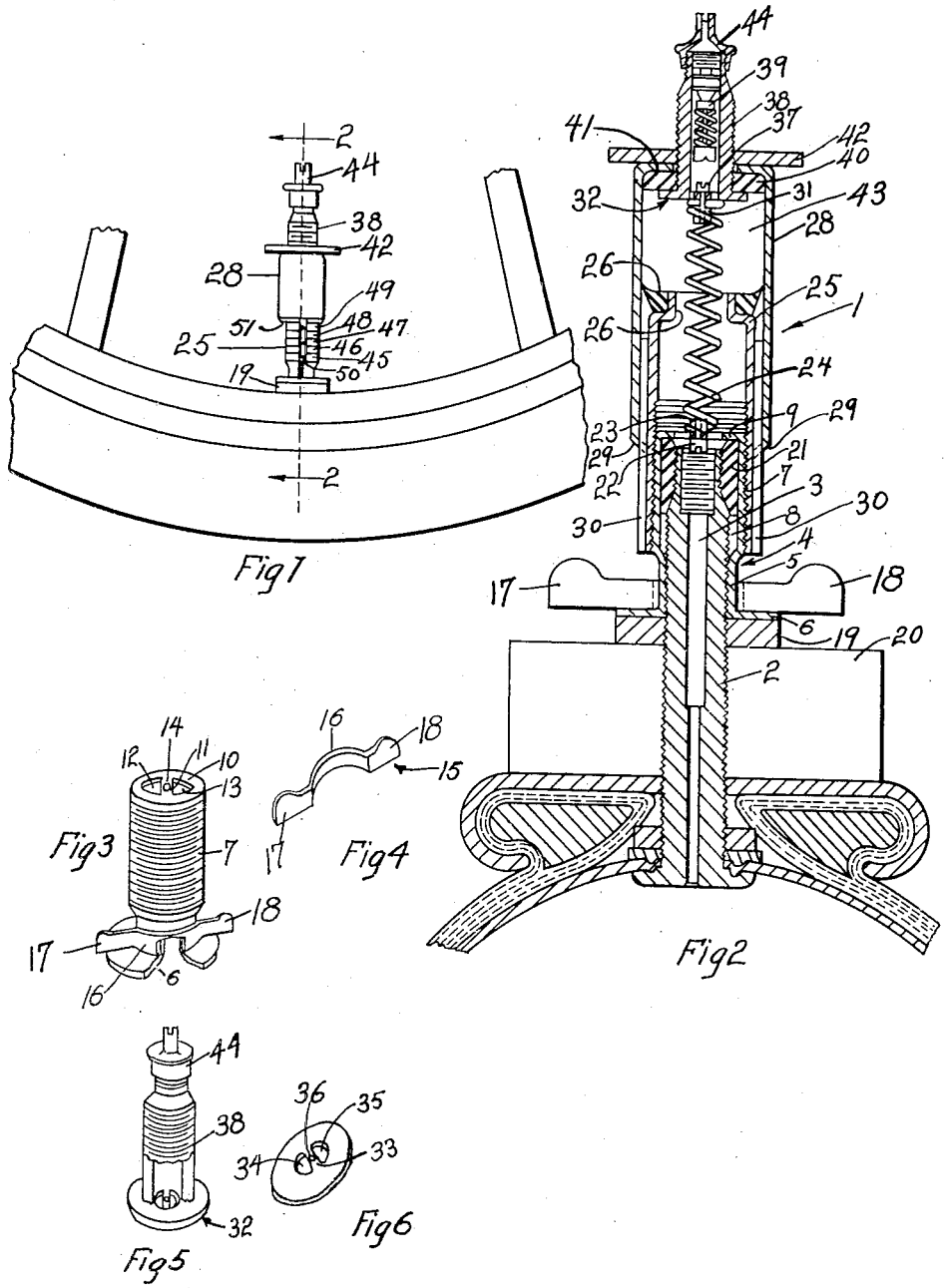

HAROLD B. CODY, OF PALM SPRINGS, CALIFORNIA.

PNEUMATIC-TIRE-FILLING DEVICE.

1,350,068.   Specification of Letters Patent.   Patented Aug. 17, 1920.

Application filed May 12, 1919. Serial No. 296,681.

*To all whom it may concern:*

Be it known that I, HAROLD B. CODY, a citizen of the United States, residing at Palm Springs, in the county of Riverside and State of California, have invented new and useful Improvements in Pneumatic-Tire-Filling Devices, of which the following is a specification.

My invention relates to air gages and consists of the novel features herein shown, described and claimed.

The principal object of my invention is to make an air gage which may be readily and permanently applied to a tire valve to show the air pressure in the valve.

Figure 1 is a fragmentary side elevation showing an air gage embodying the principles of my invention in use upon a tire upon the rim of a wheel.

Fig. 2 is an enlarged diametrical longitudinal sectional detail of the tire valve and air gage, the view being taken on the line 2—2 of Fig. 1.

Fig. 3 is a perspective of the base member of the air gage.

Fig. 4 is a perspective of the handle member for operating the base shown in Fig. 3.

Fig. 5 is a perspective of the inlet valve casing.

Fig. 6 is a perspective of the base of the inlet valve casing.

Referring to the drawing in detail, my air gage 1 is applied to a standard tire valve casing 2. The regular valve inside valve casing 2 is removed from the chamber 3 of the tire valve casing 2. The base member 4 of the air gage comprises an internally screw threaded neck portion 5 having a flange 6 extending outwardly from its lower end, an externally screw threaded portion 7 extending upwardly from the neck 5 and having an enlarged chamber 8 and a cap portion 9 rigid with the upper end of the portion 7. The cap portion 9 comprises a flange 10 extending forwardly all the way around from the upper edge of the portion 7 and a bridge 11 extending diametrically across the flange 10, there being air holes 12 and 13 on each side of the bridge and a screw hole 14 through the center of the bridge.

The handle member 15 is made of sheet metal and consists of a half circle band 16 fitting against the neck 5 and ears 17 and 18 extending outwardly from the ends of the band. The band 16 is spot welded to the neck 5 so that the ears 17 and 18 may be used for screwing the base member 4 down upon the washer 19, said washer 19 fitting against the felly 20. A soft washer 21 is pressed into the chamber 8 through the neck 5 to fit around the upper end of the tire valve casing 2, so that when the base is screwed down a tight joint is formed between the tire valve casing 2 and the base 4.

The screw 22 is inserted upwardly through the opening 14 in the bridge 11 and tapped into a head 23 and the lower end of the pulling spring 24 is connected to the head 23. The inner telescoping member 25 is screwed down upon the external thread of the portion 7 of the base, a gasket seat 26 is formed at the upper end of the member 25, the spring 24 extends upwardly loosely through the seat 26, and a soft pump washer 27 fits upon the seat 26. The outer telescoping member 28 is slidingly mounted upon the member 25, there being teeth 29 extending from the lower edge of the member 28 into grooves 30 to hold the member 28 from rotating upon the member 25 and to allow the member 28 to slide freely up and down. The washer 27 forms an air tight joint between the members 25 and 28.

The upper end of the spring 24 is connected to the head 31 and the head 31 is connected to the base 32 of the air valve casing. The base 32 of the air valve casing is a washer having a bridge 33 forming air openings 34 and 35 on each side of the bridge and there being a central opening 36 through the bridge, and a screw 37 is inserted downwardly through the opening 36 and tapped into the head 31. The base 32 is welded to the lower end of the air valve casing 38, the inlet valve inside 39 is mounted in the casing 38, a soft washer 40 is placed upon the casing 38 against the base 32, and the casing 38 is inserted upwardly through the head 41 of the member 28. A nut 42 is screwed down upon the casing 38 against the head 41 to tighten the soft washer 40 to make a tight joint to hold air in the chamber 43 of the member 28.

The nut 42 is a large disk adapted for manual operation so that it may be held to hold the casing 38 from rotating when a hose nipple is being applied to connect the pump to the casing 38 and when the cap 44 is being applied.

Enameled indicator strips 45, 46, 47, 48, 49 and so on, are welded around the periphery of the lower end of the member 25, each strip being of a different color, and each strip indicating five pounds of pressure.

When the tire is deflated the telescoping member 28 will slide down to the limit of its movement under the tension of the spring 24, and the tension of the spring may be such that it takes fifty pounds of pressure in the tire to start the member 28 upwardly; then as the pressure in the tire increases the member 28 will move upwardly and the graduations 50 at the ends of the strips 45, 46, 47, 48 and 49 will read upwardly 50, 55, 60, 65 and so on, so that the gage will show at a glance the pressure in the tire. The lower edge 51 of the telescoping member 28 serves as the indicator, pointer, or finger and the color of the strips upon which this edge rests, and the number will show at a glance the pressure in the tire.

Especial attention is called to the construction employing a pulling spring 24.

Various changes may be made without departing from the spirit of my invention as claimed.

I claim:

1. A pneumatic tire filling device comprising a stem fixed to the tire forming an air conduit having an outside screw thread, a base, screw seated upon the stem, an inner telescoping member connected to the base forming an air tight joint and having gage lines on its periphery, an outer telescoping member slidably mounted on the inner telescoping member its lower edge forming an indicator for the gage lines, a flexible piston ring mounted at the top of the inner telescoping member forming a slidable air tight joint between it and the outer telescoping member, a pulling spring connecting the base to the outer telescoping member and an air inlet valve mounted upon the outer telescoping member having means for connecting it with a proper air supply.

2. A pneumatic tire filling device comprising a stem fixed upon the tire forming an air conduit, an inner telescoping member mounted upon said stem having gage lines on its periphery, an outer telescoping member, its lower edge forming an indicator for the gage lines, a flexible piston ring mounted at the top of the inner telescoping member forming an air tight joint between it and the outer telescoping member a pulling spring connecting the base to the outer telescoping member, an air inlet valve mounted upon the outer telescoping member having means for connecting it with a proper air supply.

In testimony whereof I have signed my name to this specification.

HAROLD B. CODY.